US 9,332,034 B2

(12) United States Patent
Zaitsev

(10) Patent No.: US 9,332,034 B2
(45) Date of Patent: May 3, 2016

(54) SYSTEM AND METHODS FOR AUTOMATIC DESIGNATION OF ENCRYPTION POLICIES FOR USER DEVICES

(71) Applicant: Kaspersky Lab ZAO, Moscow (RU)

(72) Inventor: Oleg V. Zaitsev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 29 days.

(21) Appl. No.: 14/291,328

(22) Filed: May 30, 2014

(65) Prior Publication Data

US 2015/0188947 A1     Jul. 2, 2015

(30) Foreign Application Priority Data

Dec. 27, 2013 (RU) ................................ 2013158123

(51) Int. Cl.
| | |
|---|---|
| G06F 17/00 | (2006.01) |
| H04L 29/06 | (2006.01) |
| G06F 21/57 | (2013.01) |
| G06F 21/10 | (2013.01) |

(52) U.S. Cl.
CPC .............. H04L 63/20 (2013.01); G06F 21/577 (2013.01); H04L 63/0428 (2013.01); H04L 63/14 (2013.01); G06F 21/105 (2013.01); G06F 2221/2107 (2013.01)

(58) Field of Classification Search
CPC ....... G06F 21/50; G06F 21/60; G06F 21/602; G06F 21/604; G06F 21/62; G06F 21/6209; G06F 21/6218; G06F 21/70; G06F 21/74; G06F 21/78; G06F 21/577; G06F 21/105; G06F 2221/2107; H04L 63/20; H04L 63/1433; H04L 41/0893; H04L 63/1441
USPC .................. 726/1, 22, 26; 713/164–166, 182; 705/51, 59
See application file for complete search history.

(56) References Cited

U.S. PATENT DOCUMENTS

| | | | |
|---|---|---|---|
| 7,636,936 B2 * | 12/2009 | Wright | .................... G06F 21/32 379/15.03 |
| 7,647,622 B1 | 1/2010 | Sobel et al. | |
| 8,136,149 B2 | 3/2012 | Freund | |
| 8,341,717 B1 | 12/2012 | Delker et al. | |
| 8,386,392 B2 * | 2/2013 | Bhogal et al. | ................... 705/59 |
| 8,423,795 B2 | 4/2013 | Kawakami | |
| 8,429,424 B2 | 4/2013 | Witt et al. | |
| 2006/0080736 A1 * | 4/2006 | Park | ...................... G06F 21/577 726/22 |
| 2007/0266422 A1 | 11/2007 | Germano et al. | |
| 2008/0052395 A1 | 2/2008 | Wright et al. | |
| 2010/0125911 A1 | 5/2010 | Bhaskaran | |
| 2010/0132041 A1 | 5/2010 | Chu et al. | |
| 2010/0146582 A1 * | 6/2010 | Jaber | ................... G06F 21/6218 726/1 |
| 2012/0254602 A1 | 10/2012 | Bhansali et al. | |
| 2013/0159704 A1 | 6/2013 | Chandrasekaran | |

FOREIGN PATENT DOCUMENTS

| | | |
|---|---|---|
| RU | 2453917 C1 | 6/2012 |
| WO | 2011104663 A1 | 9/2011 |

* cited by examiner

*Primary Examiner* — Daniel Potratz
(74) *Attorney, Agent, or Firm* — Arent Fox LLP; Michael Fainberg

(57) ABSTRACT

Disclosed are system, methods, and computer program product for designation of encryption policies for user devices. An example method includes determining one or more criteria for the user device related to encryption requirements of the user device; determining numeric values for each of the one of more criteria; determining a coefficient for the device based on the numeric values; determining an encryption policy for the device based on the coefficient; and applying the determined encryption policy to the device.

20 Claims, 3 Drawing Sheets

SYSTEM AND METHODS FOR AUTOMATIC DESIGNATION OF ENCRYPTION POLICIES FOR USER DEVICES

CROSS-REFERENCE TO RELATED APPLICATIONS

This application claims benefit of priority under 35 U.S.C. 119(a)-(d) to a Russian Application No. 2013158123 filed on Dec. 27, 2013, which is incorporated by reference herein.

TECHNOLOGY FIELD

The present disclosure relates generally to the field of data encryption, and more specifically, to systems, methods and computer program products for automatic designation of encryption policies for user devices.

BACKGROUND

With the ever-increasing popularity of computers and personal communication devices, the number and diversity of devices used on corporate network is rapidly growing. For example, while corporate networks may have been previously limited to stationary computers and notebooks, now smart phones, tablets and other portable communication user devices are being used by employees alongside stationary computers and notebooks in the network. It is therefore becomes difficult for an administrator to manually manage so many user devices.

One of the techniques of automation of management of user devices connected to the corporate network is a sorting or classification of devices in accordance with certain features or criteria (e.g., the type of a device, the user of the device, the software installed on the device, and so on), with later use of such sorting to solve various network administration problems.

Some current solutions provide methods that make it possible to ensure the security of devices and of a corporate network in which those devices are being used, but these solutions do not provide adequate security of the information being stored on the user devices in the event that such devices are moved from the bounds of the corporate network, and they do not allow an efficient response to the changes to the configuration of these devices.

SUMMARY

Disclosed are systems, methods and computer program products for automatic designation of the encryption policies for user devices in a corporate local-area network based on the configuration of these devices, their operating conditions and other criteria.

In one aspect, an example method for designation of encryption policies for a user device comprises determining one or more criteria for the user device related to encryption requirements of the user device; determining numeric values for each of the one of more criteria; determining a coefficient for the device based on the numeric values; determining an encryption policy for the device based on the coefficient; and applying the determined encryption policy to the device.

In one aspect, the one or more criteria include, but not limited to, users or owners of the device; software installed on the device; hardware of the device; files being stored on the device; a mobility of the device; and a location of the device in a network.

In one aspect, determining the numeric values of the one or more criteria may be performed by one or both of a control server and the device itself.

In one aspect, determining the coefficient for the device may be performed by determining a weighted sum of the numeric values.

In one aspect, the encryption policies may indicate one or more of: whether it is necessary to encrypt the device; a place of the device in an encryption queue established after a sorting of one or more devices including the device based on their respective coefficients; a type of encryption for the device indicating a full disk encryption or encryption of separate files; and an encryption algorithm for the device.

In one aspect, determining the coefficient for the device may be performed by using a database of encryption policies corresponding to different coefficients.

In one aspect, the method may further comprise determining, based on the encryption policies of one or more devices, a number of necessary licenses to be purchased for encryption software.

In one aspect, the method may further comprise determining, based on the encryption policies of one or more devices, an order of encryption of the one or more devices using a number of licenses for encryption software.

In one aspect, the method may further comprise periodically recalculating the coefficient for the device; and when the coefficient changes, determining new encryption policies for the device based on the coefficient.

In another aspect, an example system for designation of encryption policies for a device includes a processor configured to determine one or more criteria for the user device related to encryption requirements of the user device; determine numeric values for each of the one of more criteria; determine a coefficient for the device based on the numeric values; determine an encryption policy for the device based on the coefficient; and apply the determined encryption policy to the device.

In another aspect, an example computer program product stored on a non-transitory computer-readable storage medium, the computer program product comprising computer-executable instructions for designation of encryption policies for a user device, including instructions for determining one or more criteria for the user device related to encryption requirements of the user device; determining numeric values for each of the one of more criteria; determining a coefficient for the device based on the numeric values; determining an encryption policy for the device based on the coefficient; and applying the determined encryption policy to the device.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and together with the detailed description, serve to explain theft principles and implementations.

DETAILED DESCRIPTION

Figure 1:
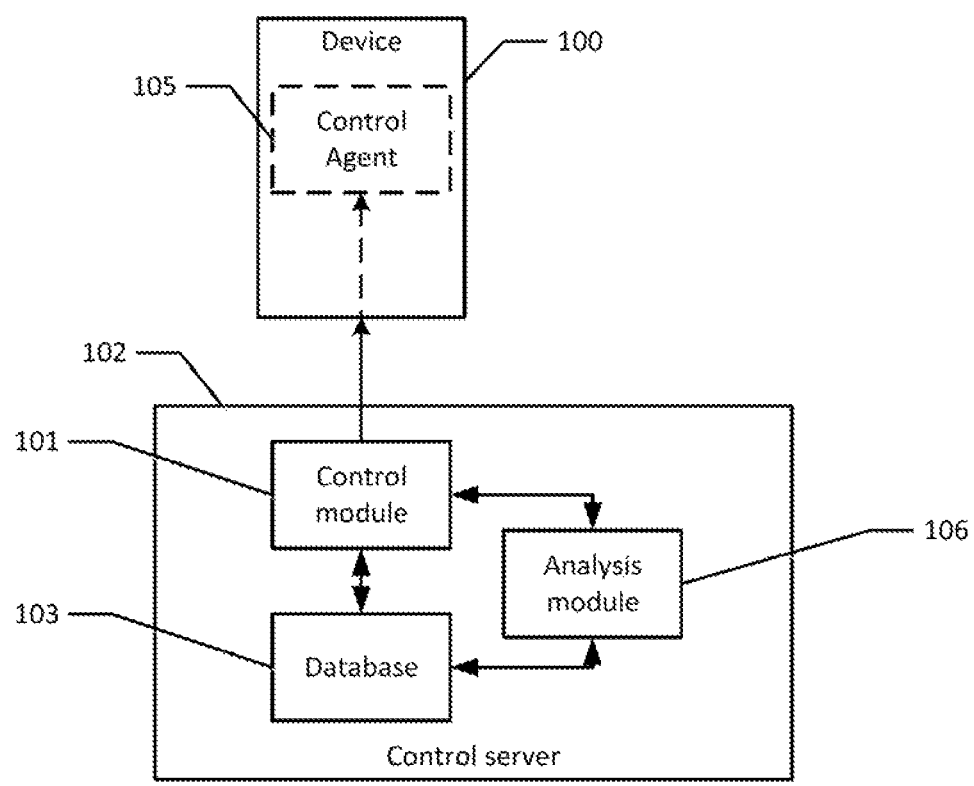
FIG. 1 shows an example of an automatic system for designation of encryption policies for user devices in accordance with one example aspect.

Example aspects are described herein in the context of a system, method and computer program product for automatic designation of encryption policies for user devices, such as personal computers (PCs), notebooks, tablets, smart phones, flash cards connected to a corporate network. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The choice of an encryption policy for user devices is a complex problem for a corporate network with a large number of devices. The problem of choosing an encryption policy involves designating appropriate policies for the devices. Appropriate policies may refer to the policies appropriate for the needs of a device; for example, on one hand, the policies should ensure the security of the data being stored, and on the other hand, they should have minimum effect on the productivity of the device. To obtain a complete understanding of a device in a network, a broad set of criteria may be used for a more flexible selection of the appropriate encryption policies. Such criteria may include, but not limited to, the users of the devices, the software installed on the devices, the hardware of the devices, the files being stored on the device, and the location of the device in a corporate local-area network.

In one example aspect, device location criteria may be used to determine the mobility of the device, such as, for example, whether the device leaves the bounds of the corporate local-area network, where within the corporate network the device is located, and so on. Statistics as to the location may be obtained, for example, by analyzing the points of access to which the device is connected, from the subnet mask, or by using data from a geolocation module of the device. If it is established that the device is in motion, the device is classified as mobile for a criterion of mobility, otherwise the device is classified as nonmobile (i.e. stationary). This criterion may also be determined by analyzing data about the hardware of the device; if the hardware corresponds to a notebook or a cell phone then it may be classified as mobile. In some aspects, not only cell phones, notebooks or tablets may be classified mobile, but also stationary PCs may be moved around, for example, travel from one work site to another. In some example aspects, the location of the device criteria may be used to determine the following types of location: the device is not moving, the device is moving within the corporate network, or the device is leaving the bounds of the corporate network.

In one example aspect, the criteria of the user of the devices identify the owners of the devices or the persons who are temporarily using a particular device for work. These criteria may indicate either a particular person or a certain group of users, such as administrators, senior managers, developers, and so on. A particular person may be determined, for example, by his/her name and job title, identification number (e.g., Social Security number), or account record. This group of criteria may also characterize the behavior of the user; in one example aspect, these criteria may be used to determine the use of removable data media by the user, user working on the Internet, and the installation of application software on the device.

In one example aspect, the criteria of software may characterize the software installed on the user device and in control of the device (e.g., the operating system and components, applications, microprograms, and so on). In a particular aspect, these criteria may indicate specific software; for example, the criterion KIS indicates whether Kaspersky Internet Security (KIS) has been installed on the device. In another particular aspect, the criteria indicate the version of the software, such as the criterion KIS 2010 indicating whether the KIS version 2010 has been installed on the device. The criteria also determine the affiliation of the software with a particular group, such as gaming software, office programs, browsers, antivirus software, special software, and so on. Special software may refer to a set of programs used to solve a particular class of problems, such as the software of an automated control system for technological processes. The criterion may also characterize the vulnerability of the software, e.g., by showing how much the given software threatens the security of the device. During the sorting to determine the first priority devices that need to be updated, in a particular aspect, a criterion is used for the age of the software, indicating how old the software is.

In one example aspect, files criteria may characterize the files being stored on the user device. These criteria may be related to the type of documents being stored, the number of these documents, the classification level of the documents (e.g., a special marking which shows the degree of secrecy of the information stored on their data storage medium) or their confidentiality (e.g., the information kept in the document is publicly accessible, or its access is restricted to a group of people). These criteria may be used to determine the designation and purposes of use of the device, for example, the computer of a secretary or a developer, a server with a database, the mobile device of a particular person, and so on.

In one example aspect, to obtain the values of the criteria a control agent on the device may be used to sort through and analyzes the documents being stored on the device. For example, the control agent may determine the type of the documents, the confidentiality of the documents and the classification level. To determine the confidentiality, in one example aspect, the control agent may use the methods of searching through a dictionary, syntax sorting of document fragments by a template, and digital fingerprint technologies. To determine the classification level, in one example aspect, the control agent may use the same methods and technologies as for the determination of the confidentiality.

In various example aspects, these criteria may take on both Boolean values and certain discrete values depending on the purposes of the sorting. For example, the criterion of vulnerability of the software in one example aspect may take on values of 0—vulnerable or 1—no vulnerabilities found in the given software. In another example aspect, this criterion takes on values from 0 to 5, where 0 characterizes software in which no vulnerabilities are known, while 5 characterizes software in which vulnerabilities are regularly found.

Depending on the purposes of the sorting, different criteria may be chosen. The sorting of devices may be performed by descending or ascending coefficient of the device, which is obtained on the basis of the criteria. The coefficient of the device, in one example aspect, may be obtained using, for example, neural network, fuzzy logic, and/or adding up with weighting of the significance of the criteria. In one example, the coefficient may have a different applied value, depending on the criteria used for the scorekeeping and the purposes of the sorting.

FIG. 1 depicts an example system for designation of encryption policies for devices in accordance with principles disclosed herein. The system includes the user device 100 for which it is necessary to designate an encryption policy. The user device 100 may be a PC, notebook, tablet, smartphone, flash card or other type of device that stores and communicates data. The system further includes a control server 102 connected to the device 100 via a network, such a local area network. The server 102 includes a control module 101 that computes coefficients for devices 100, a database 103 storing information on the criteria and the encryption policies, and analysis module 106 that selects the criteria whose values are needed to determine the coefficient of the device. In one example aspect, the criteria may be obtained from the current rules established for designating the encryption policies. The rules are kept in the database 103 and, in a particular aspect, they are a listing of criteria. After selecting the criteria, the analysis module 106 sends the criteria to the control module 101, the control module 101 obtains the values of these criteria for the device 100, and to obtain the criteria for the control module 101 queries the device 100 itself and the database 103. Using the obtained values, the control module 101 calculates the coefficient of the device 100. After calculating the coefficient of the device 100, the control module 101 sends the value of the coefficient back to the analysis module 106, which uses the information stored in the database 103 and designates the encryption policies for the device 100 in accordance with the calculated coefficient. In one example aspect, the analysis module 106 sends the encryption policies to the control module 101, which forwards the designated policies to the control agent 105 on the device 100. The control agent 105 receives and applies the policies to the device 100.

In various aspects, different techniques may be used to obtain the coefficient of the user device 100. For example, an adding up with weighting of the significance of the criteria:

$$Kf = X_1*Kr_1 + X_2*Kr_2 + X_3*Kr_3 + \ldots + X_n*Kr_n, \text{ where:}$$

Kf is the coefficient of the device;
$X_n$ is the significance factor;
$Kr_n$ is the value of the criterion.

The significance factor reflects the importance of the criterion obtained and accounts for differences in the significance of the criteria; this factor may be variable or strictly assigned.

Based on the coefficient of the user device 100, the encryption policy may be designated for the user device 100. The encryption policy generally specifies:

1) the need for encryption, which indicates whether it is even necessary to encrypt the device;
2) the order of encrypting the given device, which indicates the place in the encryption queue, and it is established after a sorting of the devices in terms of the coefficients obtained for the devices;
3) the type of encryption specifies full disk encryption of the device or encryption of separate files of the device; and
4) the encryption algorithm.

In an example aspect, database 103 is used to establish the encryption policy on the basis of the coefficient of the device. An example aspect of the database is shown below, in which the left-hand column indicates the value of the coefficient of the device, and the right-hand column indicates the corresponding policy.

TABLE 1

| Coefficient of device | Encryption policy for the devices |
| --- | --- |
| Kf > 5 | Full disk encryption of all sectors of the data media of the device |
| Kf > 4 | Encryption of all files on the device except executable ones and libraries of components |
| Kf > 3 | Encryption of confidential, secret, and all text documents and images |
| Kf > 2 | Encryption of confidential, secret, and all text documents |
| Kf > 1 | Encryption of confidential and secret documents |
| Kf = 1, Kf < 1 | No encryption is done |

In another example aspect, the database may have the following structure, in which the left-hand column indicates the policy elements, and the right-hand column indicates the value of the coefficient above which the element is included in the policy.

TABLE 2

| Policy element | Coefficient of device |
| --- | --- |
| Full disk encryption | Kf > 5 |
| Encryption of executable files | Kf > 4 |
| Encryption of images | Kf > 3 |
| Encryption of text documents | Kf > 2 |
| Encryption of confidential documents | Kf > 1 |
| Encryption of secret documents | Kf > 1 |
| ... | ... |

In this manner, an appropriate encryption policy for the user device 100 may be assembled from the elements in accordance with the calculated coefficient for the user device 100. In one example aspect, the policies may be rigidly set, and in another example aspect, the policies may be flexible. In the case where the policy is not rigid, as in Table 1, but flexible as in Table 2, the policy may be defined in accordance with a calculated coefficient, and in the case where the coefficient is reduced/enlarged, the policy items may be dynamically removed/added without a need to define a new policy as in Table 1. After defining the encryption policy for the device 100, these policies may be applied to the user device 100 by control agents 105 deployed the user device 100.

A calculation of the coefficient for a user device 100 using the above-disclosed methodology is illustrated next. For the calculation of the coefficient for a mobile device belonging to a senior manager, on which confidential documents are being stored, the following criteria may be selected: mobility ($X_1$), presence of confidential documents ($X_2$), job title of the user of the device ($X_3$). The following values are determined for the criteria: $X_1=1$ (device is mobile), $X_2=1$ (device is storing confidential documents), $X_3=2$ (device of a manager). The coefficient of the user device may be determined as follows:

$$Kf = X_1*Kr_1 + X_2*Kr_2 + X_3*Kr_3 = 1.1*1 + 2*1 + 0.5*2 = 4.1$$

Based on the computed value of coefficient Kf, and according to Table 1, the designated encryption policy for the devices provides that all files on the device, except for executable files and libraries of components, must be encrypted.

In one example aspect, the described system may determine the necessary number of licenses to be purchased for software enabling the encryption of the devices. For this, the above-described system calculates the coefficient of the devices in the network and designates the encryption policy for these devices. The analysis module 106, analyzing the designates policies, determines the number of devices that must be encrypted, for example, the number of such devices N, and also determines which of these devices need full disk encryption, for example, M devices, and which of these devices need file encryption, which is N−M devices. As a result, the recommended number of licenses to be purchased is N, of which M should afford the possibility of full disk encryption, while N−M licenses may apply file encryption. In addition, some example aspects perform a repeat calculation for the devices in the network, such as once a month or when new devices are connected to the network. Such a recalculation lets the network administrator to maintain the number of necessary licenses in an up-to-date status.

In another example aspect, the described system may be used to determine the order of encryption for a limited number of licenses for encryption software. For this, the above-described system may calculate the coefficient of the devices, and the control module 101 may perform a sorting of the devices in order of decreasing coefficients. The encryption policies then may be applied as a first priority to devices with the highest coefficient.

In yet another example aspect, the described system may performs a periodic recalculation of the coefficient of the device for devices in the network, and when the device coefficient changes a new encryption policy may be automatically designated for this device.

Figure 2:
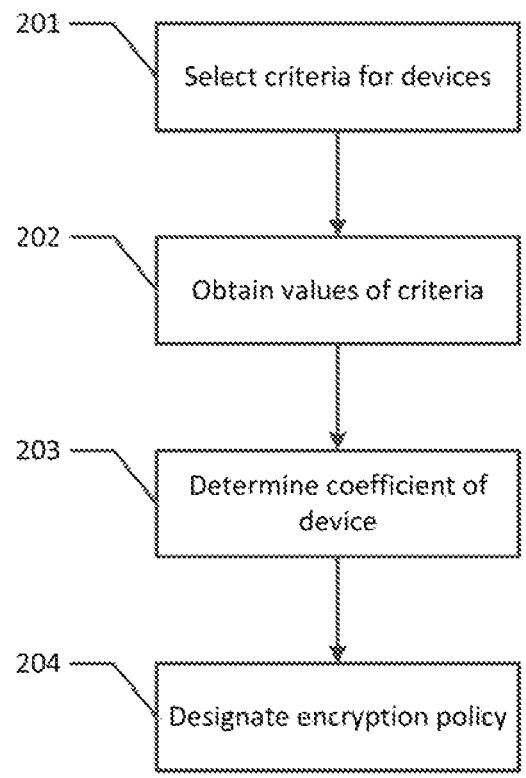
FIG. 2 is a flowchart of an example method for designation of an encryption polices for user devices in accordance with one example aspect.

FIG. 2 depicts an example method for designating encryption policies for user devices in accordance with principles disclosed herein. At step 201, criteria that characterize a user device from the standpoint of the need for encryption are determined the user device. For example, such criteria may include criteria for determining the mobility of the device; criteria for determining the owners of the devices or the persons who are temporarily using the given device for work; and criteria for characterizing the documents kept on the device. These criteria may be chosen for each specific sorting based on the established rules in the network. After the criteria have been determined, at step 202, values of the criteria for the device for which policies need to be determined are obtained. There are different ways of obtaining these values. In one example aspect, a control agent (e.g., control agent 105 of FIG. 1) may be used to obtain the values of the criteria and sends them to a control server 102. In another example aspect, the control server 102 independently obtains these values. For example, to determine the location of the device the control server 102 obtains data from the control agent 105, which in turn obtains the data from geolocation services, and in another example aspect, the control server 102 determines the subnet in which the device is operating. In yet another example aspect, a mixed method may be used to obtain the values of the criteria, in which depending on the situations the control server 102 uses both the control agent 105 and its own services, such as a port scanner. After obtaining the values of the criteria, at step 203, the obtained values are processed to determine the coefficient of the device. Based on the coefficient, at step 204, an appropriate encryption policy is designated for the user device.

Figure 3:
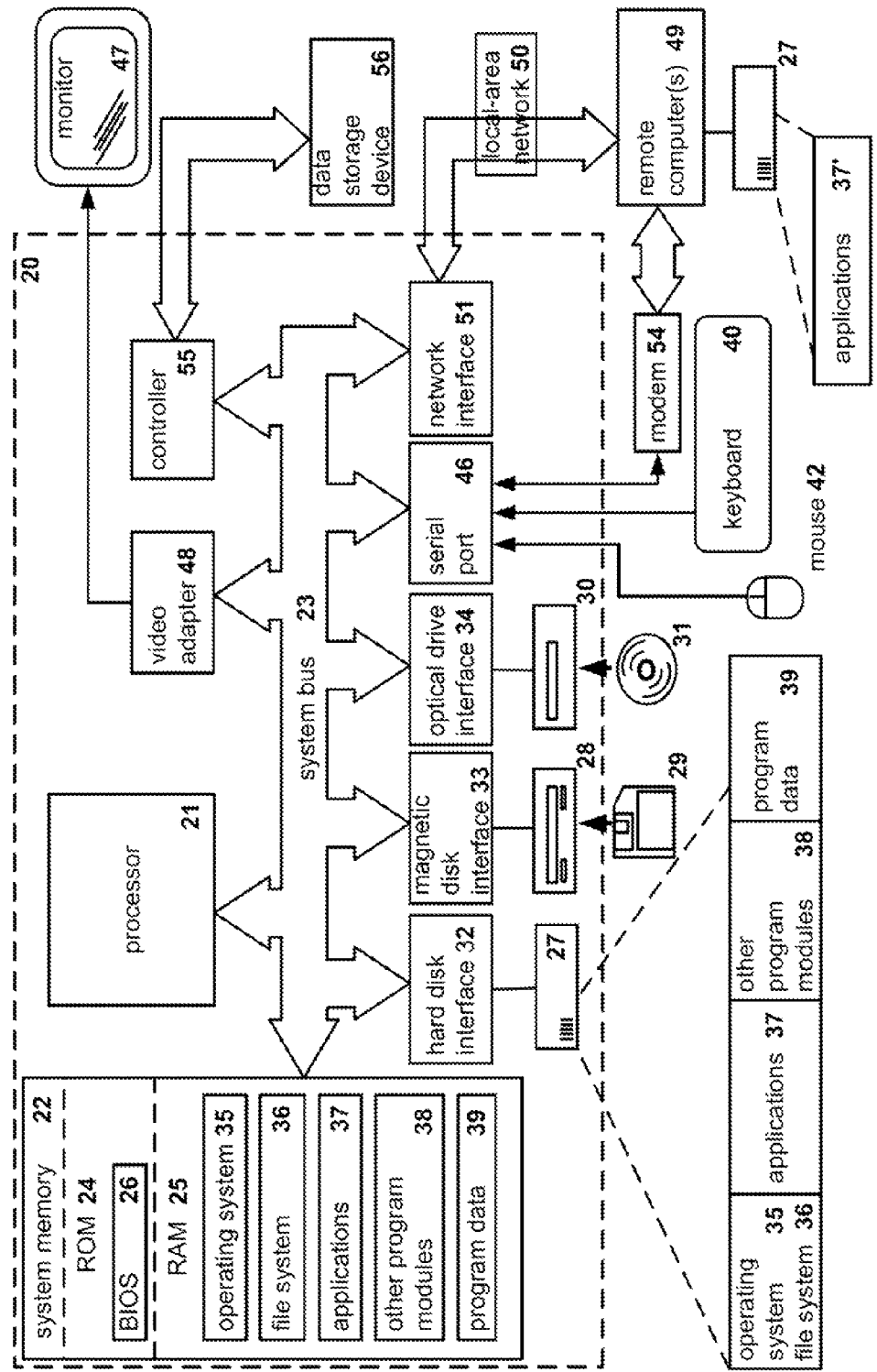
FIG. 3 shows an example of a general-purpose computer system that may be used to implement systems and methods for designation of encryption policies for user device in accordance with various example aspects.

FIG. 3 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 28, as shown in FIG. 4. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof, if implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for designation of encryption policies for each of a plurality of user devices connected in a network, comprising:
   determining, by a hardware processor of a computing device connected with each of the plurality of user devices via the network, one or more criteria for sorting the plurality of user devices in accordance with encryption requirements of each user device;
   determining numeric values for each of the one or more criteria;
   determining a coefficient for each user device based on the numeric values;
   determining an encryption queue by sorting the plurality of user devices based on each respective coefficient;
   selecting an encryption policy from a plurality of encryption policies for each user device based on the coefficient, wherein the encryption policies are configured to:
      correspond to a plurality of defined coefficient numerical ranges for indicating: a full disk encryption of all sectors of data media of each user device, an encryption of all files on each user device excluding executable files and libraries of components, an encryption of one or more of confidential, secret and all text documents and images, and no encryption, and
      indicate at least a position of each user device in the encryption queue; and
   applying the selected encryption policy to each user device.

2. The method of claim 1, wherein the one or more criteria include one or more of:
   users or owners of each user device;
   software installed on each user device;
   hardware of each user device;
   files being stored on each user device;
   a mobility of each user device; and
   a location of each user device in the network.

3. The method of claim 1, wherein determining the numeric values of the one or more criteria is performed by one or both of a control server and each user device.

4. The method of claim 1, wherein determining the coefficient for each user device is performed by determining a weighted sum of the numeric values.

5. The method of claim 1, wherein the encryption policies are further configured to indicate:
   a necessity for encrypting each user device; and
   an encryption algorithm for each user device.

6. The method of claim 1, wherein determining the coefficient for each user device is performed by using a database of encryption policies corresponding to different coefficients.

7. The method of claim 1, further comprising:
   determining, based on the encryption policies of the plurality of user devices, a number of licenses to be purchased for encryption software.

8. The method of claim 1, further comprising:
   determining, based on the encryption policies of the plurality of user devices, an order of encryption of the plurality of user devices using a number of licenses for encryption software.

9. The method of claim 1, further comprising:
   periodically recalculating the coefficient for each user device; and
   determining and applying new encryption policies to each user device based on a recalculated coefficient.

10. A system for designation of encryption policies for each of a plurality of user devices connected in a network, the system comprising:

a hardware processor of a computing device connected with each of the plurality of user devices via the network configured to:
  determine one or more criteria for sorting the plurality of user devices in accordance with encryption requirements of each user device;
  determine numeric values for each of the one or more criteria;
  determine a coefficient for each user device based on the numeric values;
  determine an encryption queue by sorting the plurality of user devices based on each respective coefficient;
  select an encryption policy from a plurality of encryption policies for each user device based on the coefficient, wherein the encryption policies are configured to:
    correspond to a plurality of defined coefficient numerical ranges for indicating: a full disk encryption of all sectors of data media of each user device, an encryption of all files on each user device excluding executable files and libraries of components, an encryption of one or more of confidential, secret and all text documents and images, and no encryption, and
    indicate at least a position of each user device in the encryption queue; and
  apply the selected encryption policy to each user device.

11. The system of claim 10, wherein the one or more criteria include one or more of:
  users or owners of each user device;
  software installed on each user device;
  hardware of each user device;
  files being stored on each user device;
  a mobility of each user device; and
  a location of each user device in the network.

12. The system of claim 10, wherein the numeric values of the one or more criteria is determined by one or both of a control server and each user device.

13. The system of claim 10, wherein the coefficient for each user device is determined by determining a weighted sum of the numeric values.

14. The system of claim 10, wherein the encryption policies are further configured to indicate:
  a necessity for encrypting each user device; and
  an encryption algorithm for each user device.

15. The system of claim 10, wherein the coefficient for each user device is determined by using a database of encryption policies corresponding to different coefficients.

16. The system of claim 10, wherein the hardware processor is further configured to:
  determine, based on the encryption policies of the plurality of user devices, a number of licenses to be purchased for encryption software.

17. The system of claim 10, wherein the hardware processor is further configured to:
  determine, based on the encryption policies of the plurality of user devices, an order of encryption of the plurality of user devices using a limited number of licenses for encryption software.

18. The system of claim 10, wherein the hardware processor is further configured to:
  periodically recalculate the coefficient for each user device; and
  determine and apply new encryption policies to each user device based on a recalculated coefficient.

19. A computer program product stored on a non-transitory computer-readable storage medium, the computer program product comprising computer-executable instructions executable by a hardware processor of a computing device connected with each of a plurality of user devices via a network for designation of encryption policies for each of the plurality of user devices connected in the network, including instructions for:
  determining one or more criteria for sorting the plurality of user devices in accordance with encryption requirements of each user device;
  determining numeric values for each of the one or more criteria;
  determining a coefficient for each user device based on the numeric values;
  determining an encryption queue by sorting the plurality of user devices based on each respective coefficient;
  selecting an encryption policy from a plurality of encryption policies for each user device based on the coefficient, wherein the encryption policies are configured to:
    correspond to a plurality of defined coefficient numerical ranges for indicating: a full disk encryption of all sectors of data media of each user device, an encryption of all files on each user device excluding executable files and libraries of components, an encryption of one or more of confidential, secret and all text documents and images, and no encryption, and
    indicate at least a position of each user device in the encryption queue; and
  applying the selected encryption policy to each user device.

20. The computer program product of claim 19, wherein the one or more criteria include one or more of:
  users or owners of each user device;
  software installed on each user device;
  hardware of each user device;
  files being stored on each user device;
  a mobility of each user device; and
  a location of each user device in the network.

* * * * *